United States Patent
Sachadel-Solarek et al.

(10) Patent No.: US 9,963,766 B2
(45) Date of Patent: May 8, 2018

(54) HYPOEUTECTOID BEARING STEEL

(71) Applicant: AKTIEBOLAGET SKF, Göteborg (SE)

(72) Inventors: Urszula Alicja Sachadel-Solarek, Utrecht (NL); Mohamed Sherif, Hilversum (NL)

(73) Assignee: AKTIEBOLAGET SKF, Gothenburg (SE)

(*) Notice: Subject to any disclaimer, the term of this patent is extended or adjusted under 35 U.S.C. 154(b) by 0 days. days.

(21) Appl. No.: 14/431,342

(22) PCT Filed: Sep. 26, 2013

(86) PCT No.: PCT/EP2013/070032
§ 371 (c)(1),
(2) Date: Mar. 26, 2015

(87) PCT Pub. No.: WO2014/049032
PCT Pub. Date: Apr. 3, 2014

(65) Prior Publication Data
US 2015/0361533 A1    Dec. 17, 2015

(30) Foreign Application Priority Data
Sep. 26, 2012    (EP) .................. 12186172

(51) Int. Cl.
C22C 38/54    (2006.01)
C22C 38/22    (2006.01)
(Continued)

(52) U.S. Cl.
CPC .............. *C22C 38/54* (2013.01); *C21D 1/20* (2013.01); *C21D 1/32* (2013.01); *C22C 38/001* (2013.01);
(Continued)

(58) Field of Classification Search
CPC ....... C22C 38/001; C22C 38/01; C22C 38/04; C22C 38/22; C22C 38/62; C22C 38/64
See application file for complete search history.

(56) References Cited

U.S. PATENT DOCUMENTS 5,261,975 A    11/1993    Sorstrom et al.
7,763,124 B2    7/2010    Iwamoto et al.
(Continued)

FOREIGN PATENT DOCUMENTS

CN    1618541 A    5/2005
CN    1774521 A    5/2006
(Continued)

OTHER PUBLICATIONS

Communication dated Dec. 7, 2016 in counterpart European patent application No. 13 766 367.0, and claims 1-13 examined therein.
(Continued)

*Primary Examiner* — Rebecca Y Lee
(74) *Attorney, Agent, or Firm* — Bryan Peckjian; SKF USA Inc. Patent Dept.

(57) ABSTRACT

A steel alloy comprising from: (a) 0.6 to 0.9 wt. % carbon, (b) 0.1 to 0.5 wt. % silicon, (c) 0.1 to 1.5 wt. % manganese, (d) 1.5 to 2.0 wt. % chromium, (e) 0.2 to 0.6 wt. % molybdenum, and up to: (f) 0.25 wt. % nickel, (g) 0.3 wt. % copper, (h) 0.2 wt. % vanadium, (i) 0.2 wt. % cobalt, (j) 0.2 wt. % aluminum, (k) 0.1 wt. % niobium, (l) 0.2 wt. % tantalum, (m) 0.05 wt. % phosphorous, (n) 0.03 wt. % sulphur, (o) 0.075 wt. % tin, (p) 0.075 wt. % antimony, (q) 0.075 wt. % arsenic, (r) 0.01 wt. % lead, (s) 350 ppm nitrogen, (t) 100 ppm oxygen, (u) 50 ppm calcium, (v) 50 ppm boron, (w) 50 ppm titanium, the balance iron, including any other unavoidable impurities, wherein the alloy comprises molybdenum and silicon in a weight ratio of $0.4 \leq$ Mo/
(Continued)

Si≤6.0 and comprises molybdenum and chromium in a weight ratio of 0.1≤Mo/Cr≤0.4.

1 Claim, 4 Drawing Sheets

(51) Int. Cl.
  *F16C 33/12*  (2006.01)
  *C22C 38/00*  (2006.01)
  *C22C 38/02*  (2006.01)
  *C22C 38/04*  (2006.01)
  *C22C 38/24*  (2006.01)
  *C22C 38/26*  (2006.01)
  *C21D 1/20*  (2006.01)
  *C21D 1/32*  (2006.01)
  *C22C 38/06*  (2006.01)
  *C22C 38/42*  (2006.01)
  *C22C 38/44*  (2006.01)
  *C22C 38/46*  (2006.01)
  *C22C 38/50*  (2006.01)

(52) U.S. Cl.
  CPC .......... *C22C 38/002* (2013.01); *C22C 38/008* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/42* (2013.01); *C22C 38/44* (2013.01); *C22C 38/46* (2013.01); *C22C 38/50* (2013.01); *F16C 33/121* (2013.01); *C21D 2211/002* (2013.01); *F16C 2204/64* (2013.01); *F16C 2204/70* (2013.01)

(56) References Cited

U.S. PATENT DOCUMENTS

| | | | |
|---|---|---|---|
| 2003/0113223 A1* | 6/2003 | Kano | C22C 38/002 420/84 |
| 2005/0257860 A1* | 11/2005 | Takayama | 148/572 |
| 2006/0081314 A1 | 4/2006 | Iwamoto et al. | |
| 2010/0296764 A1* | 11/2010 | Strandell et al. | 384/625 |
| 2012/0063944 A1 | 3/2012 | Lund et al. | |

FOREIGN PATENT DOCUMENTS

| | | | |
|---|---|---|---|
| GB | 977138 A | | 12/1964 |
| GB | 2328479 A | * | 2/1999 |
| JP | 2011514930 A | * | 5/2011 |
| WO | 0063450 A1 | | 10/2000 |
| WO | 0079151 A1 | | 12/2000 |
| WO | 2010134867 A1 | | 11/2010 |

OTHER PUBLICATIONS

C. Wegst et al., Stahlschluessel, Verlag Stahlschluessel Wegst GmbH, 2007, p. 495.

* cited by examiner

HYPOEUTECTOID BEARING STEEL

CROSS REFERENCE TO RELATED APPLICATIONS

This is a National Stage Application claiming the benefit of International Application Number PCT/EP2013/070032 filed on 26 Sep. 2013, which claims the benefit of European (EP) Patent Application Serial Number 12186172.8, filed on 26 Sep. 2012, both of which are incorporated herein by reference in their entireties.

TECHNICAL FIELD

The present invention relates generally to the field of metallurgy and to a bearing steel composition for through-hardened steel, whereby the carbon content is less than or substantially equal to that at the eutectoid point.

BACKGROUND OF THE INVENTION

Bearings are devices that permit constrained relative motion between two parts. Rolling element bearings comprise inner and outer raceways and a plurality of rolling elements (balls or rollers) disposed there-between. For long-term reliability and performance it is important that the various elements have resistance to rolling fatigue, wear and creep. An important characteristic of bearing steels is the hardenability, i.e. the depth up to which the alloy is hardened after putting it through a heat-treatment process.

An example of a type of bearing steel is DIN 1.3536 (100CrMo7-3(W5)). There is still room for improvement, however.

SUMMARY OF THE INVENTION

It is an aim of the present invention to define a steel alloy composition of the above kind, in which the cementite phase in the austenite phase field is suppressed in favour of the more desirable and more stable Cr-rich carbides such as M7C3, where M is: (Cr, Fe, Mo, Mn). In the present invention, the stoichiometry M7C3 gives the advantage of inhibiting excessive austenite grain growth compared with the typical M3C (cementite, or alloy cementite). Furthermore, the stoichiometry M7C3 leads to better mechanical properties and improved resistance to rolling contact fatigue in a through-hardened bearing component made from the steel alloy.

The aforementioned aim is achieved by means of a steel alloy comprising:
from 0.6 to 0.9 wt. % carbon,
from 0.1 to 0.5 wt. % silicon,
from 0.1 to 1.5 wt. % manganese,
from 1.5 to 2.0 wt. % chromium,
from 0.2 to 0.6 wt. % molybdenum,
from 0 to 0.25 wt. % nickel,
from 0 to 0.3 wt. % copper,
from 0 to 0.2 wt. % vanadium,
from 0 to 0.2 wt. % cobalt,
from 0 to 0.2 wt. % aluminium,
from 0 to 0.1 wt. % niobium,
from 0 to 0.2 wt. % tantalum,
from 0 to 0.05 wt. % phosphorous,
from 0 to 0.03 wt. % sulphur,
from 0 to 0.075 wt. % tin,
from 0 to 0.075 wt. % antimony,
from 0 to 0.075 wt. % arsenic,
from 0 to 0.01 wt. % lead,
up to 350 ppm nitrogen,
up to 100 ppm oxygen,
up to 50 ppm calcium,
up to 50 ppm boron,
up to 50 ppm titanium,
the balance iron, together with any other unavoidable impurities, wherein the alloy comprises molybdenum and silicon in a weight ratio of $0.4 \leq Mo/Si \leq 6.0$ and molybdenum and chromium in a weight ratio $0.1 \leq Mo/Cr \leq 0.4$.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In the present invention, the steel alloy composition comprises from 0.6 to 0.9 wt. % carbon, preferably from 0.7 to 0.8 wt. % carbon, more preferably from 0.72 to 0.78 wt. % carbon. In combination with the other alloying elements, this results in a desired microstructure. The relatively low carbon content of a hypoeutectoid bearing steel impacts on the hardenability of the steel, and potentially restricts the applicability of the steel to components (such as bearing rings) having a medium wall thickness. To circumvent this potential issue, the manganese content and the molybdenum content of the steel alloy are towards the top of the range that is usually specified for these elements in the aforementioned DIN 1.3536 steel.

The steel composition comprises from 1.5 to 2 wt. % chromium. Apart from its positive affect on hardenability, the content of chromium was found during thermodynamic calculations to greatly impact the type of carbide obtainable during hardening in that if the concentration is too low, the undesirable cementite phase is stabilised. The alloy therefore comprises at least 1.5 wt. % chromium. On the other hand, the chromium content must be restricted, for example, to ensure sufficient carbon in solid solution in the austenite phase during hardening. For the austenite to transform into a sufficiently hard structure at lower temperatures (57 to 63 HRC) it must possess sufficient dissolved carbon and nitrogen. The steel alloy therefore comprises a maximum of 2.0 wt. % chromium. The steel composition preferably comprises from 1.5 to 1.8 wt. % chromium, more preferably from 1.6 to 1.7 wt. % chromium.

The steel composition comprises from 0.2 to 0.6 wt. % molybdenum, preferably from 0.3 to 0.5 wt. % molybdenum, more preferably from 0.3 to 0.4 wt. % molybdenum. Molybdenum may act to avoid grain boundary embrittlement. However, higher molybdenum contents may result in significant amounts of austenite being retained in the structure.

A Mo/Cr ratio of between 0.1 and 0.4 enhances the thermodynamic stability of Cr-rich carbides. More preferably, the Mo/Cr ratio lies between 0.15 and 0.3.

The steel alloy composition comprises from 0.1 to 0.5 wt. % silicon, preferably from 0.1 to 0.4 wt. % silicon, more preferably from 0.2 to 0.3 wt. % silicon. In combination with the other alloying elements, this results in the desired microstructure with a minimum amount of retained austenite. Silicon helps to suppress the precipitation of cementite and carbide formation. However, too high a silicon content may result in undesirable surface oxides and a poor surface finish. For this reason, the maximum silicon content is 0.5 wt. %. Steels with high silicon content tend to retain more austenite in their hardened structures due to the carbide-suppressing characteristics of the element. It follows that the steel concentration of silicon can be reduced to lower the retained austenite content.

A Mo/Si ratio of between 0.4 and 6.0 helps ensure decreased segregation during solidification of the steel. More preferably, the Mo/Si ratio lies between 0.5 and 3.0.

The steel alloy composition comprises from 0.1 to 1.5 wt. % manganese, preferably from preferably from 0.1 to 1.0 wt. % manganese, more preferably from 0.5 to 1.0 wt. % manganese, still more preferably from 0.7 to 0.9 wt. % manganese. Manganese acts to increase the stability of austenite relative to ferrite. Manganese may also act to improve hardenability.

With a lower steel carbon content, the overall percentage of carbides that is retained during hardening is typically low, which has the benefit of enabling lower hardening temperatures in production, with obvious cost savings. On the other hand, with less carbides retained during austenitisation, the risk of austenite grain growth, which is detrimental to mechanical properties and fatigue, is higher.

To prevent any possible excessive austenite grain growth during hardening, it is believed beneficial to add micro-alloying additions, and nitrogen, such that small, very fine precipitates that pin the prior austenite grain boundaries are formed. For this purpose, the elements V, Ta, Nb and N may be added to form MX [M: (V, Cr, Nb/Ta, Fe); X: primarily N with some C].

In some embodiments, therefore, nitrogen is added such that the steel alloy comprises from 50 to 350 ppm nitrogen, preferably between 100 and 350 ppm nitrogen. In other embodiments, there is no deliberate addition of nitrogen. Nevertheless, the alloy may necessarily still comprise at least 50 ppm nitrogen due to exposure to the atmosphere.

Preferably, the steel alloy comprising added nitrogen, further comprises one or more of the following alloying elements in the following weight percentages: up to 0.2 wt. % vanadium; up to 0.1 wt. % niobium; and up to 0.2 wt. % tantalum.

When the steel alloy comprises vanadium and niobium, these alloying elements are preferably present in a weight ratio of $2.0 \leq V/Nb \leq 6.0$. This ratio ensures favourable thermodynamic stability of V-rich precipitates and enhances their refinement. Preferably, the V/Nb ratio lies between 3.0 and 5.0.

When the steel alloy comprises vanadium and tantalum, these alloying elements are preferably present in a weight ratio of $1.0 \leq V/Ta \leq 12.0$. This ratio ensures favourable thermodynamic stability of V-rich precipitates and enhances their refinement. Preferably, the V/Nb ratio lies between 1.5 and 4.0.

The deliberate dissolution of niobium and tantalum in the vanadium- and nitrogen-rich precipitates is advantageous, in that it renders them more stable. Such vanadium- and nitrogen-rich precipitates are even more stable than the M7C3.

In the present work, it has been found that the formation of vanadium- and nitrogen-rich precipitates significantly improves both the strength and hardness of the final bearing steel structures, which leads to better resistance to rolling contact fatigue.

In examples of the steel alloy which comprises vanadium and added nitrogen, the formation of vanadium- and nitrogen-rich precipitates is favoured over the formation of vanadium carbide since the former is more stable thermodynamically. For a given fraction of vanadium carbides and vanadium nitrides the vanadium nitrides tend to be smaller, more stable and as such more effective in pinning prior austenite grain boundaries. Vanadium- and nitrogen-rich precipitates also contribute more to the strengthening of the bearing steel structure.

Preferably, the steel alloy comprises no more than 0.1 wt. % aluminium. More preferably, the steel alloy is free of aluminium, especially when the steel alloy comprises one or more of the micro-alloying elements (V and/or Nb and/or Ta). The presence of aluminium is undesirable, as nitrogen can be lost due to the formation of aluminium nitrides. When the presence of a small amount of aluminium is unavoidable, however, the alloy suitably comprises aluminium and nitrogen in a weight ratio of $0.014 \leq Al/N \leq 0.6$, preferably $0.014 \leq Al/N \leq 0.1$. This ratio ensures that not all of the nitrogen is bound to aluminium, leaving some available for e.g. the V-rich precipitates, thereby refining and stabilising them.

As noted, the steel composition may also optionally include one or more of the following elements:
from 0 to 0.25 wt. % nickel (for example 0.02 to 0.2 wt. % nickel)
from 0 to 0.3 wt. % copper (for example 0.02 to 0.2 wt. % copper)
from 0 to 0.2 wt. % vanadium (for example 0.05 to 0.2 wt. % vanadium)
from 0 to 0.2 wt. % cobalt (for example 0.05 to 0.2 wt. % cobalt)
from 0 to 0.2 wt. % aluminium (for example 0.05 to 0.1 wt. % aluminium)
from 0 to 0.1 wt. % niobium (for example 0.05 to 0.1 wt. % niobium)
from 0 to 0.2 wt. % tantalum (for example 0.05 to 0.2 wt. % tantalum)
from 0 to 0.035 wt. % nitrogen (for example 50 to 350 ppm nitrogen)

It will be appreciated that the steel alloy referred to herein may contain unavoidable impurities, although, in total, these are unlikely to exceed 0.3 wt. % of the composition. Preferably, the alloys contain unavoidable impurities in an amount of not more than 0.1 wt. % of the composition, more preferably not more than 0.05 wt. % of the composition. In particular, the steel composition may also include one or more impurity elements. A non-exhaustive list of impurities includes, for example:
from 0 to 0.05 wt. % phosphorous
from 0 to 0.03 wt. % sulphur
from 0 to 0.075 wt. % arsenic
from 0 to 0.075 wt. % tin
from 0 to 0.075 wt. % antimony
from 0 to 0.01 wt. % lead
from 0 to 0.005 wt. % boron The steel alloy composition preferably comprises little or no sulphur, for example from 0 to 0.015 wt. % sulphur.

The steel alloy composition preferably comprises little or no phosphorous, for example from 0 to 0.025 wt. % phosphorous.

The steel composition preferably comprises ≤15 ppm oxygen. Oxygen may be present as an impurity. The steel composition preferably comprises ≤30 ppm titanium. Titanium may be present as an impurity. The steel composition preferably comprises ≤10 ppm boron. Boron may be present as an impurity at, for example, 1-5 ppm.

The steel composition preferably comprises ≤30 ppm calcium. Calcium may be present as an impurity but may also be added intentionally in very small amounts, for example 1-3 ppm.

The steel alloy composition may consist essentially of the recited elements. It will therefore be appreciated that in addition to those elements that are mandatory other non-specified elements may be present in the composition provided that the essential characteristics of the composition are not materially affected by their presence.

According to another aspect of the present invention, there is provided a bearing component, comprising a steel alloy as herein described. Examples of bearing components where the steel can be used include a rolling element (ball or cylinder), an inner ring, and an outer ring. The present invention also provides a bearing comprising a bearing component as herein described.

According to a third aspect of the present invention, there is provided an engine component, an armour component, a gear component or a railway track component comprising a steel alloy as herein described. The material may also be used in marine and aerospace applications, applications, for example gears and shafts.

The present invention will now be described further with reference to a suitable heat treatment for the steel alloy, provided by way of example.

Austenitisation (hardening) of bearing components made from the present steel alloy is typically carried out within the temperature range 800° C.-890° C. for 10 to 60 min. The austenite, refined chromium-rich carbides are primarily present at the end of the austenitisation stage just prior to subsequent cooling. Optionally, as demonstrated in the previous section, vanadium-rich nitrogen-containing precipitates may also be present during hardening and preferably contain niobium and tantalum making them more stable. Such vanadium precipitates will aid in refining the austenite grains, especially at higher austenitisation temperatures and/or long holding times typically used when more hardenability is required for the manufacturing of thick bearing component sections. The refined grains will lead to better toughness as well as higher strength and hardness of the final bearing steel product Immediately after austenitisation, the bearing components are quenched using a suitable medium, such that all the reconstructive transformation products are avoided during cooling and martensite, bainite (bainitic-ferrite), or both structures, are obtained in the steel microstructure with only small amount of retained austenite left after tempering of the martensite-containing components, or after the bainite transformation has ceased. Afterwards, the bearing components are typically cooled to room temperature.

Subsequent deep-freezing and/or tempering may be employed to further reduce the retained austenite content which ensures higher hardness and strength, with their positive effect on resistance to rolling contact fatigue. Additionally, lower retained austenite content is found to improve the dimensional stability of the bearing components allowing them to be used in demanding bearing applications where the application temperature is higher than usual.

BRIEF DESCRIPTION OF THE DRAWINGS

The invention will now be described in relation to the figures annexed hereto by way of non-limiting examples.

DETAILED DESCRIPTION OF EMBODIMENTS

Examples

The invention will now be explained with reference to the following non-limiting examples.

Steel 1, comprising in wt. %
C: 0.75
Si: 0.2
Mn: 0.8
Mo: 0.35
Cr: 1.65
Ni: max 0.25
Cu: max 0.30
P: max 0.01
S: max 0.015
As+Sn+Sb: max 0.075
Pb: max 0.002
Al: max 0.050
Fe: Balance Oxygen level should be less than 10 ppm, Ti level less than 30 ppm and Ca level less than 10 ppm. Nitrogen is present as a trace element (at least 50 ppm). The maximum limit for As is 0.04 wt. %. The Mo/Si ratio is 1.75. The Mo/Cr ratio is 0.21.

Figure 1:
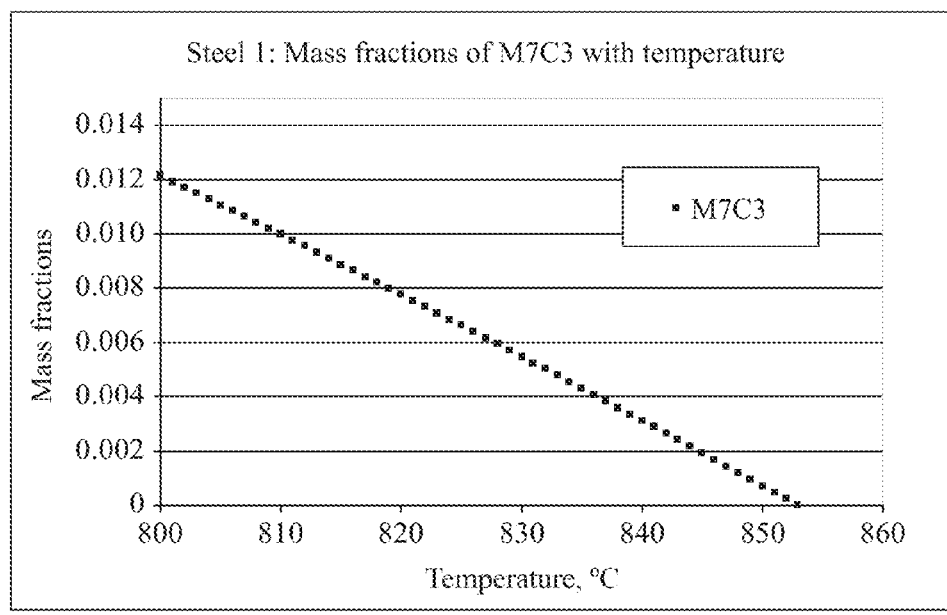
FIG. 1: Mass fraction of $M_7C_3$ with temperature for Steel 1.

The thermodynamic calculations with Thermo-Calc (TCFE6) are shown in FIG. 1, which plots the mass fraction of $M_7C_3$ with temperature.

Steel 2, comprising in wt. %
C: 0.75
Si: 0.2
Mn: 0.8
Mo: 0.35
Cr: 1.65
V: 0.1
N: 0.02
Ni: max 0.25
Cu: max 0.30
P: max 0.01
S: max 0.015
As+Sn+Sb: max 0.075
Pb: max 0.002
Al: max 0.001
Fe: Balance Oxygen level should be less than 10 ppm, Ti level less than 30 ppm and Ca level less than 10 ppm. The maximum limit for As is 0.04 wt. %. The Mo/Si ratio is 1.75. The Mo/Cr ratio is 0.21. The Al/N ratio is 0.05.

Steel 3, comprising in wt. %
C: 0.75
Si: 0.2
Mn: 0.8
Mo: 0.35
Cr: 1.65
V: 0.08
Nb: 0.02
N: 0.02

Ni: max 0.25
Cu: max 0.30
P: max 0.01
S: max 0.015
As+Sn+Sb: max 0.075
Pb: max 0.002
Al: max 0.001
Fe: Balance Oxygen level should be less than 10 ppm, Ti level less than 30 ppm and Ca level less than 10 ppm. The maximum limit for As is 0.04 wt. %. The Mo/Si ratio is 1.75. The Mo/Cr ratio is 0.21. The Al/N ratio is 0.05. The V/Nb ratio is 4.

Figure 2:
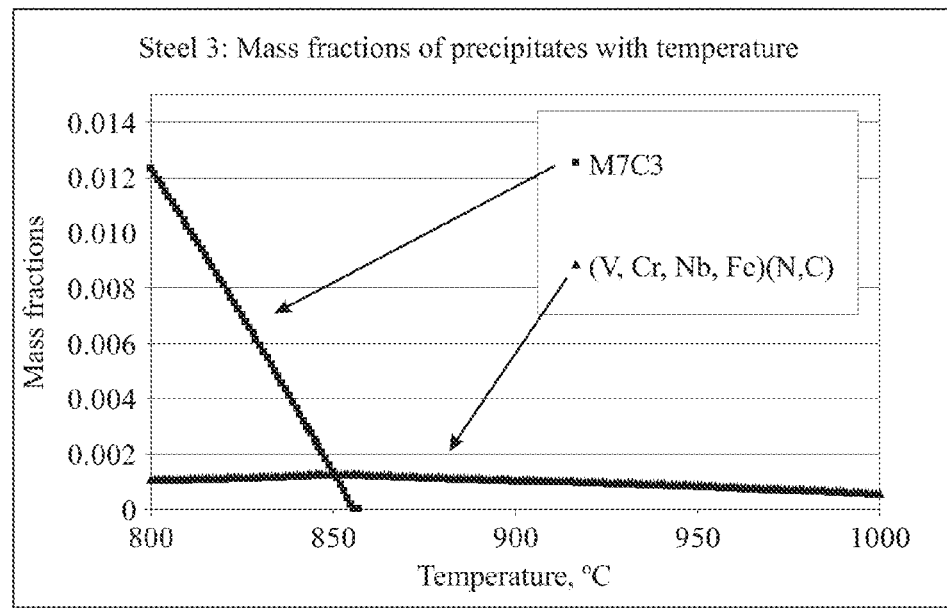
FIG. 2: Mass fraction of $M_7C_3$ and vanadium-nitrogen-rich precipitates with temperature for Steel 3.

The thermodynamic calculations with Thermo-Calc (TCFE6) are shown in FIG. 2, which plots the mass fraction of M7C3 and vanadium-nitrogen-rich precipitates with temperature.

Steel 4, comprising in wt. %
C: 0.75
Si: 0.2
Mn: 0.8
Mo: 0.35
Cr: 1.65
V: 0.08
Ta: 0.02
N: 0.02
Ni: max 0.25
Cu: max 0.30
P: max 0.01
S: max 0.015
As+Sn+Sb: max 0.075
Pb: max 0.002
Al: max 0.001
Fe: Balance Oxygen level should be less than 10 ppm, Ti level less than 30 ppm and Ca level less than 10 ppm. The maximum limit for As is 0.04 wt. %. The Mo/Si ratio is 1.75. The Mo/Cr ratio is 0.21. The Al/N ratio is 0.05. The V/Ta ratio is 4.

Steel 5, comprising in wt. %
C: 0.75
Si: 0.4
Mn: 0.8
Mo: 0.35
Cr: 1.65
Ni: max 0.25
Cu: max 0.30
P: max 0.01
S: max 0.015
As+Sn+Sb: max 0.075
Pb: max 0.002
Al: max 0.050
Fe: Balance Oxygen level should be less than 10 ppm, Ti level less than 30 ppm and Ca level less than 10 ppm. The maximum limit for As is 0.04 wt. %. The Mo/Si ratio is 0.875. The Mo/Cr ratio is 0.21.

The following further experimental results further describe the present invention by way of example. Examples of steels (with and without vanadium) were melted. The chemical compositions are presented in Table 1 below (all in wt. %, except * in ppm). The chemical composition of a reference steel, 100CrMo7-3, is also given. Each steel type was supplied in the as hot-forged condition in the form of 1 m long, Ø 30 mm bars. The total number of steel bars was 7 each. The steels in the as hot-forged condition exhibited fully pearlitic structures, as expected.

TABLE 1

| Element, wt % | Steel A | Steel B | 100CrMo7-3 |
| --- | --- | --- | --- |
| C | 0.73 | 0.73 | 0.97 |
| Si | 0.20 | 0.21 | 0.26 |
| Mn | 0.81 | 0.82 | 0.66 |
| Cr | 1.63 | 1.68 | 1.79 |
| Ni | <0.001 | <0.001 | 0.11 |
| Mo | 0.36 | 0.36 | 0.26 |
| Cu | 0.006 | 0.005 | 0.206 |
| V | 0.106 | 0.003 | 0.009 |
| P | 0.007 | 0.006 | 0.006 |
| S | 0.010 | 0.010 | 0.004 |
| Al | 0.006 | 0.033 | 0.028 |
| As | 0.001 | 0.001 | 0.015 |
| Sn | 0.001 | 0.001 | 0.011 |
| Sb | <0.0015 | <0.0015 | 0.0025 |
| Ti* | 15 | 15 | 16 |
| B* | 4 | 4 | 2 |
| Pb* | <5 | <5 | <5 |
| Ca* | 1 | 1 | 2 |
| N* | 118 | 79 | 50 |
| O* | 8.3 | 6.0 | 3.7 |

Figure 3:
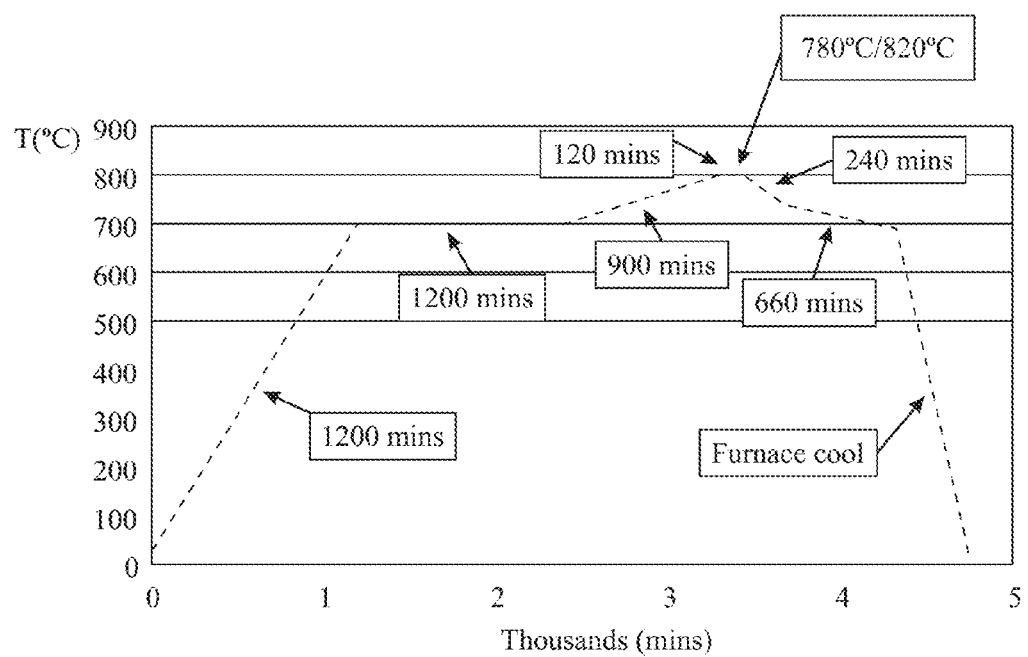
FIG. 3: Plot showing an example of the adopted spheroidise-annealing schedule.
Figure 4:
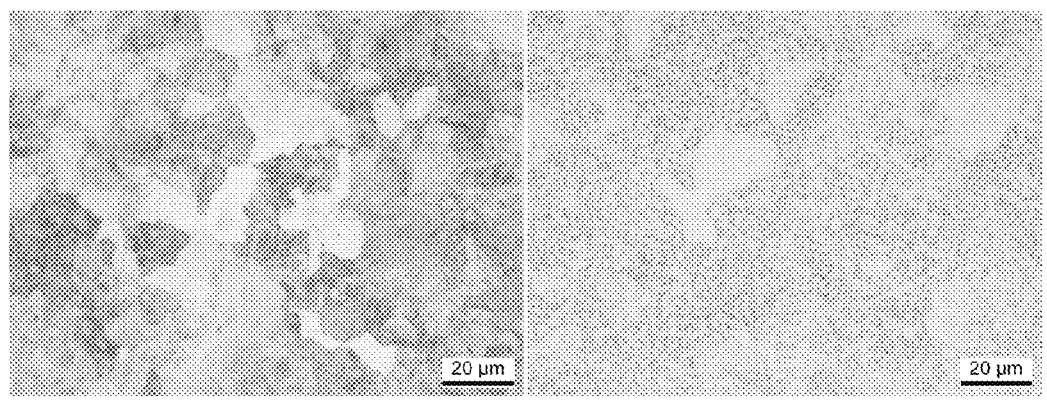
FIG. 4: SEM micrographs showing Steel A before (left) and after (right) spheroidise-annealing.

The steels were then spheroidise-annealed to facilitate easier machining and for better response to subsequent heat treatment (hardening) steps. The plot in FIG. 3 shows an example of the adopted spheroidise-annealing schedule.

The hardenability of the steels according to the present invention is an important aspect and was assessed according to the ASTM standard test specification A255-10. The assessed structures were untempered martensite.

Figure 5:
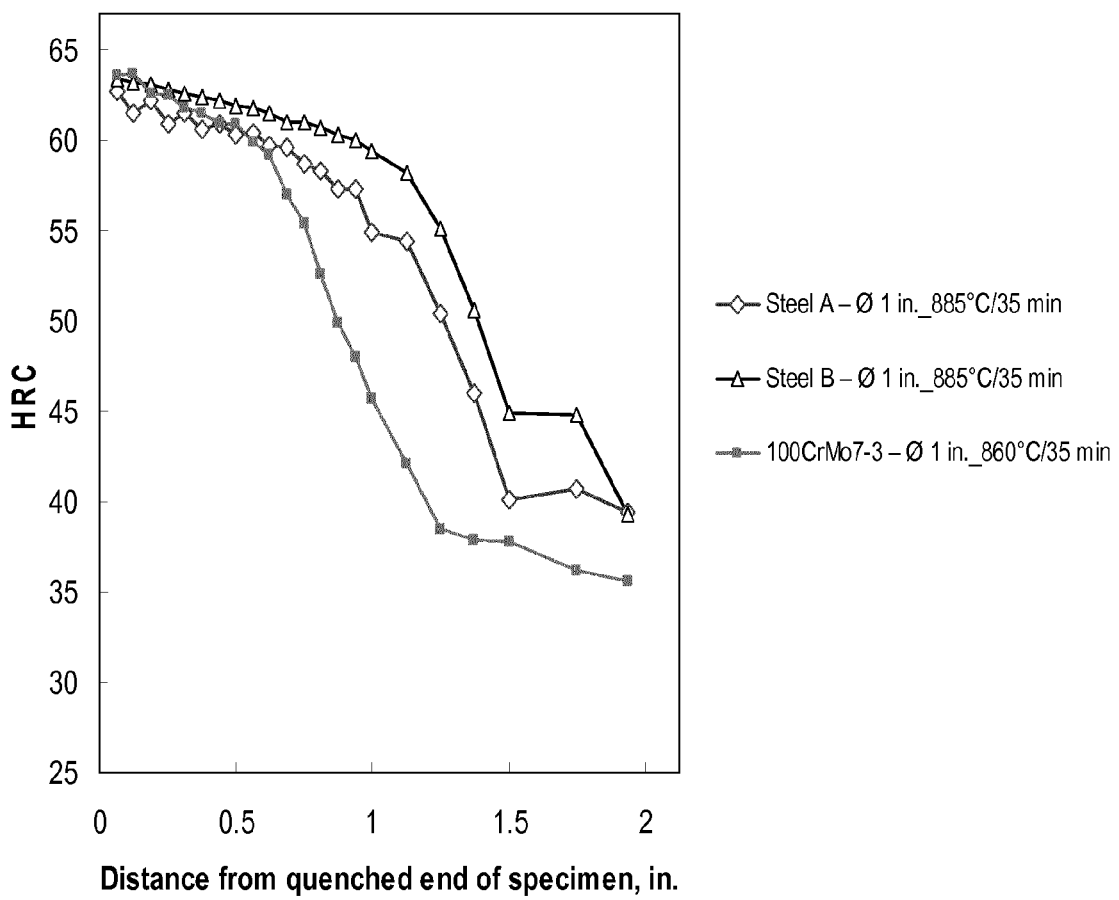
FIG. 5: Comparison of hardenability data for Steel A and Steel B and conventional 100CrMo7-3.

The plots in FIG. 5 clearly demonstrate the superior hardenability of the Steel A and Steel B with ca. 0.75 wt. % carbon, compared with the reference existing bearing steel with ca. 1 wt % carbon.

The introduction of microalloying additions such as, for example, vanadium and nitrogen means that it is possible to raise the austenitisation temperature compared with the reference steel, without the risk of excessive austenite grain growth. This can result in superior hardenability at greater depths, or, for thicker bearing components.

Additionally, the more gradual decrease in hardenability demonstrated by the steel alloy compositions according to the present invention allows for more hardness uniformity across bearing component sections. This enables better predictability regarding component growth during heat treatments, which results in easier to set grinding allowances for the subsequent stages.

Figure 6:
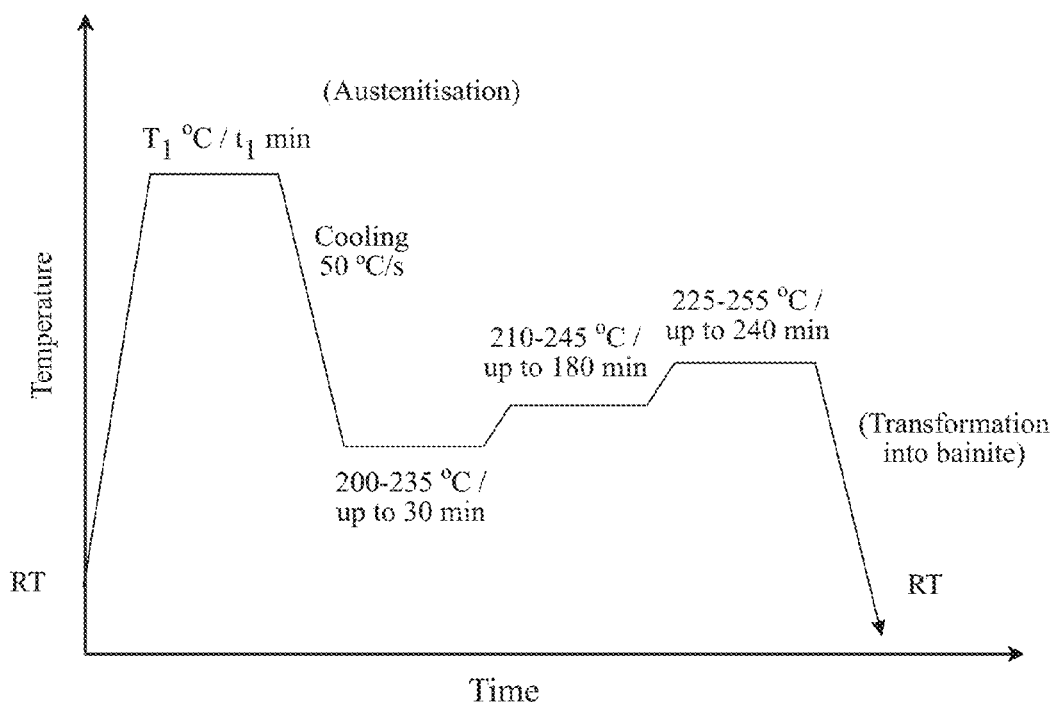
FIG. 6: Plot showing an example of how the steel alloy can be transformed into bainite.

As well as transformation into martensite, the steels were also transformed into bainite following the schematic schedule presented in FIG. 6 and Table 2 below.

TABLE 2

| | Steel A | | Steel B | 100CrMo7-3 |
| --- | --- | --- | --- | --- |
| $T_1/t_1$ | 885° C./ 50 min | 885° C./ 120 min | 885° C./ 50 min | 865° C./ 50 min |
| Bainite transformation stage variables | Identical | | | |
| HV10 | 685 | 690 | 681 | 707 |

As can be seen in Table 2, the hardness of the bainitic structures obtained from the steels according to the present invention was not significantly different from that measured on the reference bearing steel. However, for improved hardness, it was found that slightly longer transformation time into bainite was necessary.

Figure 7:
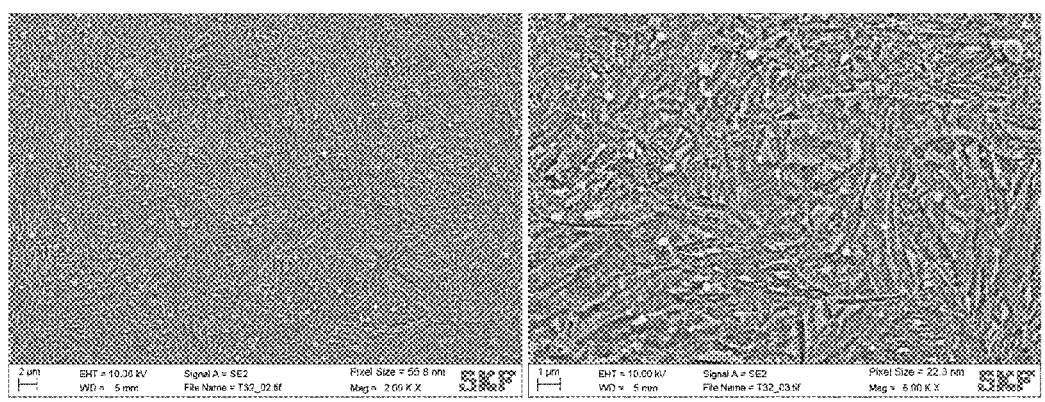
FIG. 7: SEM micrographs showing the bainitic microstructure obtained from Steel A austenitised at 885° C./120 min.

FIG. 7 presents SEM micrographs showing the bainitic microstructure obtained from Steel A, austenitised at 885° C./120 min.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A bearing component made from a steel alloy, the steel alloy consisting of: 0.73 wt. % carbon, 0.2 wt. % silicon, 0.81 wt. % manganese, 1.63 wt. % chromium, 0.36 wt. % molybdenum, <0.001 wt. % nickel, 0.006 wt. % copper, 0.106 wt. % vanadium, 0.006 wt. % aluminium, 0.007 wt. % phosphorous, 0.010 wt. % sulphur, 0.001 wt. % tin, <0.015 wt. % antimony, 0.001 wt. % arsenic, 15 ppm titanium, <5 ppm lead, 118 ppm nitrogen, 8.3 ppm oxygen, 1 ppm calcium and 4 ppm boron, the balance being iron and unavoidable impurities, wherein the steel alloy is composed of a bainite microstructure, and the bearing component is selected from the group consisting of a rolling element, an inner ring and an outer ring.

* * * * *